United States Patent
Ueda et al.

(10) Patent No.: US 7,317,554 B2
(45) Date of Patent: Jan. 8, 2008

(54) PATCH FORMING DEVICE

(75) Inventors: Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1063 days.

(21) Appl. No.: 10/319,525

(22) Filed: Dec. 16, 2002

(65) Prior Publication Data

US 2003/0112455 A1   Jun. 19, 2003

(30) Foreign Application Priority Data

Dec. 17, 2001   (JP)   ............................ 2001-383230

(51) Int. Cl.
 B41J 1/00   (2006.01)
 G06F 15/00   (2006.01)
(52) U.S. Cl. ....................................... 358/1.9
(58) Field of Classification Search ................. 358/1.9
 See application file for complete search history.

(56) References Cited

U.S. PATENT DOCUMENTS

| 5,926,617 | A | | 7/1999 | Ohara et al. | |
|---|---|---|---|---|---|
| 6,132,024 | A | * | 10/2000 | Nelson et al. | 347/19 |
| 6,141,080 | A | * | 10/2000 | Masuda | 355/38 |
| 6,164,749 | A | * | 12/2000 | Williams | 347/19 |
| 6,196,652 | B1 | * | 3/2001 | Subirada et al. | 347/19 |
| 6,204,873 | B1 | * | 3/2001 | Shimazaki | 347/172 |
| 6,215,562 | B1 | * | 4/2001 | Michel et al. | 358/1.9 |
| 6,268,930 | B1 | * | 7/2001 | Ohta et al. | 358/1.9 |
| 6,483,607 | B1 | * | 11/2002 | Van de Capelle et al. | 358/1.9 |
| 6,542,634 | B1 | * | 4/2003 | Ohga | 382/167 |
| 6,556,793 | B2 | * | 4/2003 | Nakamura | 399/15 |
| 6,606,167 | B1 | * | 8/2003 | Rees et al. | 358/1.9 |
| 7,027,067 | B1 | * | 4/2006 | Ohga | 345/589 |
| 7,034,968 | B2 | * | 4/2006 | Bhaskar et al. | 358/504 |
| 7,050,196 | B1 | * | 5/2006 | Piatt et al. | 358/1.9 |
| 2003/0030828 | A1 | * | 2/2003 | Soler et al. | 358/1.9 |
| 2003/0053085 | A1 | * | 3/2003 | Takemoto | 358/1.9 |

FOREIGN PATENT DOCUMENTS

| JP | A 1-194673 | 8/1989 |
|---|---|---|
| JP | A 2000-184220 | 6/2000 |
| JP | A 2001-26831 | 9/2001 |

* cited by examiner

*Primary Examiner*—Twyler Lamb
*Assistant Examiner*—Benjamin Dulaney
(74) *Attorney, Agent, or Firm*—Oliff & Berridge, PLC

(57) ABSTRACT

When forming a test chart for investigating output characteristic relating to yellow color agent, a printer outputs yellow color agent in a plurality of densities that correspond to various density levels and also outputs cyan color agent in a fixed and maximum density. Patches in gradations from cyan to green are formed by overlapping the yellow color agent and the cyan color agent. The patches are formed with respect to a surrounding area that is formed by outputting the cyan color agent in the fixed and maximum density. Accordingly, the colors of the patches are easier to distinguish than when the patches are formed from yellow only. Visual calibration can be easily performed even with the yellow color agent that has a low visual sensitivity.

14 Claims, 9 Drawing Sheets

LUT FOR EACH OF CYAN, MAGENTA, YELLOW, AND BLACK

In (Cin, Min, Yin, OR Kin) → INPUT DATA
In' (Cin', Min', Yin', OR Kin') → CORRECTED DATA

| INPUT DATA | CORRECTED DATA |
|---|---|
| 0 | 0 |
| 1 | 0 |
| 2 | 1 |
| 3 | 1 |
| ⋮ | ⋮ |
| 253 | 252 |
| 254 | 253 |
| 255 | 255 |

0-th DATA ↗
255-th DATA ↗

γ TEST CHART FOR EACH OF CYAN, MAGENTA, AND BLACK

PATCH FORMING DEVICE

BACKGROUND OF THE INVENTION

1. Field of the Invention

The present invention relates to a patch forming device for forming patches to be used for visually investigating output characteristic of an image forming device.

2. Description of Related Art

Conventional image forming devices that are capable of multitone printing with relatively high quality execute an operation referred to as "color calibration." Color calibration is performed in order to match density levels indicated by print data received from a high-order program with the density levels measured in images actually printed by the image forming device.

Japanese Patent Application Publication No. 2000-184220 discloses one type of visual calibration.

According to this visual calibration, densities of magenta and black are first adjusted. Next, a test chart is prepared by printing a plurality of gray patches from the mixture of magenta, yellow, and cyan and by printing a gray area surrounding the patches from black only. The density of cyan is changed in the lateral axial direction and the density of yellow is changed in the vertical axial direction. A user views the test chart and selects the patch with the optimum gray balance, that is, the patch with the best balance between the three color agents of cyan, yellow, and magenta.

SUMMARY OF THE INVENTION

With this method, the gray balance of yellow, cyan, and magenta can be observed, and therefore it is possible to easily adjust even the density of yellow, which has low visual sensitivity.

However, with this method, the freedom is two (2) because both cyan and yellow are simultaneously changed. Therefore, it is difficult to select the patch with the optimum gray balance. It is difficult to adjust the densities of cyan and yellow. Additionally, if the adjustment of the density of magenta has been attained imperfectly, then gray balance cannot be attained when the yellow and cyan densities are changed. Therefore, it is impossible to adjust the densities of yellow and cyan accurately.

Japanese Patent Application Publication No. 2000-184220 discloses a variation of this method, wherein the densities of cyan, magenta, and black are first adjusted, and thereafter the density of yellow is adjusted by observing the gray balance in the same manner as described above.

However, with this method, if the adjustment of the densities of cyan and magenta has not been attained imperfectly, then gray balance cannot be attained when the yellow density is changed. Therefore, it is still impossible to adjust the density of yellow color agent accurately.

It is an objective of the present invention to overcome the above-described problems and provide a patch forming device that can form patches that can attain an easy and accurate visual calibration even onto low visual sensitive color such as yellow.

In order to attain the above and other objects, the present invention provides a patch forming device for forming a plurality of color patches to be used for determining output characteristics of an image forming unit that can form images using a plurality of different color agents, the patch forming device comprising: a patch-data supplying portion supplying, an image forming unit that can form images using a plurality of different color agents, with patch-data for forming a plurality of color patches by a first color agent and a second color agent among the plurality of color agents, the second color agent being different from the first color agent, the patch-data including first patch-data indicative of a plurality of different levels of color density for the first color agent and second patch-data indicative of a fixed level of color density for the second color agent, thereby causing the image forming unit to output a plurality of different color patches on a recording medium, each color patch being formed of mixture of the first color agent in a corresponding density and the second color agent in the fixed density; and a surrounding-area-data supplying portion supplying the image forming unit with surrounding-area-data indicative of the fixed level of color density for the second color agent, thereby causing the image forming unit to form a surrounding-area image with the fixed density of the second color agent on the recording medium at a surrounding area that is defined around the plurality of color patches.

According to another aspect, the present invention provides a patch forming program to be executed by a computer to form a plurality of color patches to be used for determining output characteristics of an image forming unit that can form images using a plurality of different color agents, the program comprising: a patch-data supplying program supplying, an image forming unit that can form images using a plurality of different color agents, with patch-data for forming a plurality of color patches by a first color agent and a second color agent among the plurality of color agents, the second color agent being different from the first color agent, the patch-data including first patch-data indicative of a plurality of different levels of color density for the first color agent and second patch-data indicative of a fixed level of color density for the second color agent, thereby causing the image forming unit to output a plurality of different color patches on a recording medium, each color patch being formed of mixture of the first color agent in a corresponding density and the second color agent in the fixed density; and a surrounding-area-data supplying program supplying the image forming unit with surrounding-area-data indicative of the fixed level of color density for the second color agent, thereby causing the image forming unit to form a surrounding-area image with the fixed density of the second color agent on the recording medium at a surrounding area that is defined around the plurality of color patches.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figures 1, 2:
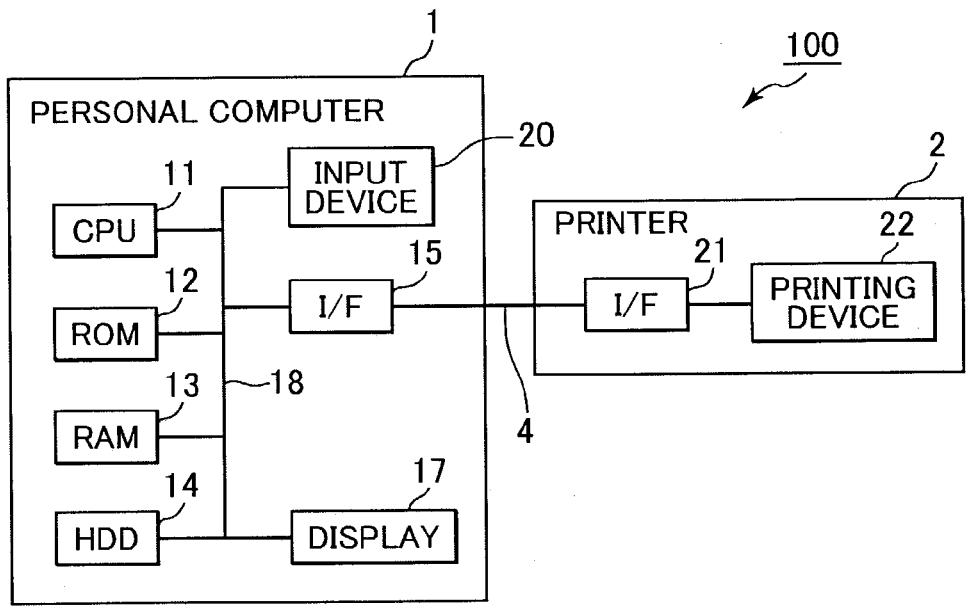
FIG. 1 is a block diagram showing configuration of a printing system that includes a patch forming device according to an embodiment of the present invention.
FIG. 2 is a schematic view showing a look up table created and stored in the patch forming device of FIG. 1.

A color patch forming device according to a preferred embodiment of the present invention will be described while referring to the accompanying drawings wherein like parts and components are designated by the same reference numerals to avoid duplicating description.

Next, a printing system that is incorporated with the patch forming device according to the embodiment will be described.

FIG. 1 is a block diagram showing configuration of a printing system 100 of the embodiment.

As shown in FIG. 1, the printing system 100 is constructed from a personal computer 1 and a printer 2, which are connected with each other via a special interface cable 4. The personal computer 1 serves as a patch forming device according to the present embodiment. The personal computer 1 and printer 2 perform data communications with each other through the special interface cable 4.

The printer 2 is provided with a printing device 22 and a personal computer interface 21. The printing device 22 performs data communications with the personal computer 1 via the personal computer interface 21 and a printer interface 15 (to be described later) in the personal computer 1.

The printing device 22 is of an ink jet type that forms images on a recording medium (paper) by ejecting ink of the four types (four color agents): cyan (C), magenta (M), yellow (Y), and black (K), based on input image data provided by the personal computer 1. The printing device 22 is configured to record multilevel color images having tones of 256 gradations for each color. It is noted that the printing device 22 is not limited to the ink jet type, but can be of other various types, such as a laser-printing type that uses toner as color agent.

The personal computer 1 includes a CPU 11, a ROM 12, a RAM 13, a hard disk device 14, the printer interface 15, a display device (CRT) 17, and an input device 20. The above components perform data communications among one another via a bus 18.

The printer interface 15 performs bi-directional data communications with the printer 2 according to a specific communication protocol determined between the personal computer 1 and the printer 2.

The display device 17 displays various data types in a format that the user of the present system 100 can view and confirm.

The input device 20 includes a keyboard, a mouse, and other input devices, and is for enabling the user to input his/her desired command and information indicative of his/her observation results of test charts during the LUT preparing process as will be described later.

The CPU 11 executes various calculations and control processes for controlling other components according to various programs stored in the ROM 12 or various programs read from the hard disk device 14 and stored in the RAM 13.

The RAM 13 is a storage device that can be arbitrarily read from or written to. The RAM 13 can store various programs read from the hard disk device 14, as well as various data obtained through calculations by the CPU 11.

The hard disk device 14 is an auxiliary storage device for storing, as files, such data types as programs and image data that are not regularly stored in the ROM 12 or RAM 13 (main storage devices).

The ROM 12 is a read-only memory, and stores various programs, such as a patch forming program (FIG. 9), a LUT preparing program (FIG. 10), a printing program, an image preparing program, and the like, and other types of data that are not required to be overwritten.

The hard disk device 14 stores four look up tables LUT for the four color agents of cyan, magenta, yellow, and black, respectively. As shown in FIG. 2, the look up table LUT for each color C, M, Y, K lists up 256 sets of corrected data In' (=Cin', Min', Yin', or Kin') in correspondence with 256 sets of input data In (=Cin, Min, Yin, or Kin) of 0 to 255. The 256 sets of input data In (=Cin, Min, Yin, or Kin) of 0 to 255 are all the input data that will possibly be inputted from the high-order program for printing operation. Each of the 256 sets of corrected data In' is a numerical value indicative of a density level that should be applied to the printer 2 in order to let the printer 2 to reproduce the density level indicated by the corresponding input data In.

The CPU 11 performs a printing process by executing the printing program and by using the LUTs. More specifically, during the printing process, the CPU 11 receives, from some high-order program (image preparing program, or the like), one set of input data (Cin, Min, Yin, Kin) indicative of a density level of each color C, M, Y, K at each pixel in a desired image. Each input data Cin, Min, Yin, Kin is a numerical value in the range of 0 to 255. The CPU 11 converts the input data (Cin, Min, Yin, Kin) into corrected data (Cin', Min', Yin', Kin') by referring to the look up tables LUT for the four colors C, M, Y, K. The CPU 11 supplies the corrected data (Cin', Min', Yin', Kin') and a print command to the printer 2, whereupon the printer 2 prints the desired image by the corrected data (Cin', Min', Yin', Kin'). As a result, the printer 2 properly reproduces the desired image represented by the original input data (Cin, Min, Yin, Kin) supplied from the high-order program. For example, when the high-order program designates Cin (density level) of 200, the 200-th set of corrected data Cin', wherein the first data set is 0-th, is retrieved from the look up table LUT for cyan. When the 200-th set of corrected data Cin' is supplied to the printer 2, the printer 2 will print cyan color on a recording medium with its density being actually measured as a density level of 200. In this way, during the printing process, the CPU 11 executes a calibrating operation to convert the input data (Cin, Min, Yin, Kin) into the corrected data (Cin', Min', Yin', Kin').

In order to prepare the LUTs for the colors of cyan, magenta, yellow, and black, the CPU 11 executes a patch forming process and an LUT preparing process according to the patch forming program and the LUT preparing program stored in the ROM 12.

During the LUT preparing process for each color, a user manipulates the input device 20 to input data indicative of his/her observation results of color patches that are formed according to the patch forming process (to be described later) for the subject color. Based on the inputted information, the CPU 11 will determine the output characteristics "E" (shown in FIG. 3) for each color C, M, Y, K, and then prepares the look up table LUT (shown in FIG. 2) for each color C, M, Y, K based on the output characteristics "E" of the subject color.

Next will be described how to prepare a look up table LUT (FIG. 2) based on the output characteristics "E" with reference to FIG. 3. The following description will be given for the case of cyan. However, the look up tables LUT for other colors can be prepared based on their own output characteristics E in the same manner as for cyan.

It is now assumed that the printer 2 has an output characteristic "E" for cyan as shown in FIG. 1. The output characteristic E is a correlation curve between the test data of 0 to 255 and the output density of 0 to 2.2. In other words, when the printer 2 is supplied with 256 number of data (test data) indicative of density levels of 0 to 255 and prints out 256 number of color patches and when the output densities of the 256 color patches are measured by a colorimeter, the output densities of the color patches are as shown in the correlation curve "E".

The ideal characteristic F between input data and output density is also plotted on the graph. The ideal characteristic F is normally linear. Accordingly, a correlation (correction characteristic curve) G between input data and corrected data (test data) is determined based on the characteristics E and F as shown in FIG. 3.

It is noted that the output characteristic E can be expressed using the following formula:

$$OD=e(test), \text{wherein}$$

"OD" is output density;
"e( )" is a function indicating the output characteristic E; and
"test" is test data (also referred to as corrected data "In'") defined along the horizontal axis of the graph in FIG. 3.

The ideal characteristic F is defined using the following equation:

$$OD=f(In), \text{wherein}$$

"f( )" is a function (normally a linear-shaped function) indicating the ideal characteristic F; and
"In" is the input data (Cin, Min, Yin, or Kin).

In order to prepare the correlation G to indicate how to convert input data In into corrected data In' (test data), the following relationship has to be established from the above-described equations:

$$e(test)=f(In).$$

Accordingly, the following relationship is established from the above-described equation:

$$g(In)=test=e^{-1}\{f(In)\}, \text{wherein}$$

"g( )" is a function indicating the characteristic G.

The look up table (LUT) of FIG. 2 is prepared by listing up the input data (vertical axis) of the correlation curve G of 0 to 255 on the first column of the look up table (LUT) and by listing up the corresponding corrected data (horizontal axis) of the correlation curve G on the second column of the look up table (LUT).

In order to determine the output characteristic E, it is conceivable to supply 255 sets of input data (density level values of 0 to 255) to the printer 2 as test data to cause the printer 2 to print out a plurality of (256) color patches that correspond to the different density levels (tone values). Each color patch is formed by uniformly providing (printing) the color agent, at a corresponding dot-percentage, in some optional shape on a print medium (print sheet). Accordingly, each patch is formed from a different density of the color agent. The patches are arranged in a pattern (lattice) on the print medium. The optical density of each patch is then measured using a calorimeter. As a result, output density is determined with respect to each set of test data (each density level in the range of 0 to 255). The output characteristic curve E is obtained as shown in FIG. 3 by plotting the output densities (vertical axis) relative to the test data of 0 to 255 (horizontal axis).

In this conceivable method, however, the output characteristic E has to be prepared based on measurements made by the colorimeter for the densities of the patches. However, the calorimeter is too expensive for an average printer-user to purchase.

Considering this potential problem, according to the present embodiment, the output characteristics E of the printer 2 for cyan, magenta, yellow, and black are determined by employing a principle described below.

Figure 4:
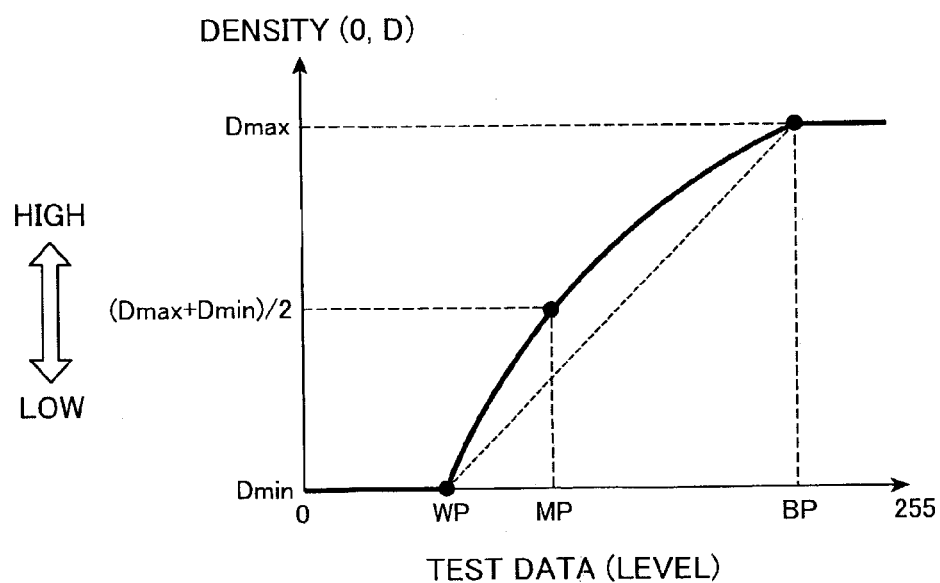
FIG. 4 is a graph showing a curve approximating the output characteristic curve E in FIG. 3.

It is noted that, as shown in FIG. 4, the output characteristic E of the printer 2 can be approximated by a curve that is defined by variables WP, BP, and γ by the following equations (1)-(3):

$$O.D=D\text{min for Level} \leq WP \quad (1),$$

$$O.D=\{((\text{Level}-WP)/(BP-WP))^{\gamma} \cdot (D\text{max}-D\text{min})+ \\ D\text{min for } WP<\text{Level}<BP \quad (2), \text{and}$$

$$O.D=D\text{max for } BP \leq \text{Level} \quad (3), \text{wherein}$$

"O.D" is the value indicative of the optical density, "Level" is the value (density level) of test data (input data), "WP" is the value of test data at a rising edge point of the output density, "BP" is the value of test data at a saturated point of the output density, "γ" is the value of an exponent determining the curve connecting the rising edge point and the saturated point of the output density, "Dmin" is the minimum density, and "Dmax" is the maximum density. It is noted that the minimum density Dmin is determined dependently on the optical density of the background (density of print medium, for example) being used. The maximum density Dmax is determined dependently on the optical density of the color agent (ink, in this example) being used in the printer 2. In this example, because the printer 2 is an inkjet printer, the maximum density Dmax is determined dependently on the optical density of ink used in the printer 2. If the printer 2 is a laser printer, the maximum density Dmax will be determined dependently on the optical density of toner used in the printer 2. Both of the minimum density Dmin and the maximum density Dmax are therefore known values.

As easily known from the above description, the CPU 11 can determine the output characteristic E when the characteristic values WP, BP, and γ are known.

Next will be given a detailed description of how to determine the characteristic values WP, BP, and γ for each of cyan, magenta, and black.

Following description will be given for the case of determining the values WP, BP, and γ for cyan. However, the values WP, BP, and γ for magenta and black can be determined in the same manner as for cyan.

It is noted that as shown in FIG. 4, while the value of test data is being increased from zero (0) to the value WP, the printer 2 will continue failing to output the color agent on the recording medium. This is because the printer 2 is controlled to print out dots with sizes of as small as possible. Accordingly, a user will not be able to see any color on the recording medium. When the value of test data reaches the value WP, the printer 2 starts outputting the color agent on the recording medium so that the user will be able to see the color agent on the recording medium.

For example, if the printer 2 is a color laser printer that uses a photosensitive drum, while the test data is in the range of 0 to WP, the energy of the exposure light is so weak that no toner is supplied to the photosensitive drum. As a result, no toner is transferred to the print sheet, so that the user will not be able to see any color on the print sheet. Once the test data is incremented to reach the value WP, the energy of the exposure light will be sufficient to induce supply of toner to the photosensitive drum. At this point, the user will be able to see the color of the toner on the printed image.

It is noted that color agent outputted on the recording medium slightly spreads within the recording medium. Therefore, as shown in FIG. 4, while the value of test data is being increased from the value WP, the output density will become saturated to the maximum density Dmax when the test data reaches the value BP before reaching the maximum value 255.

Figure 5:
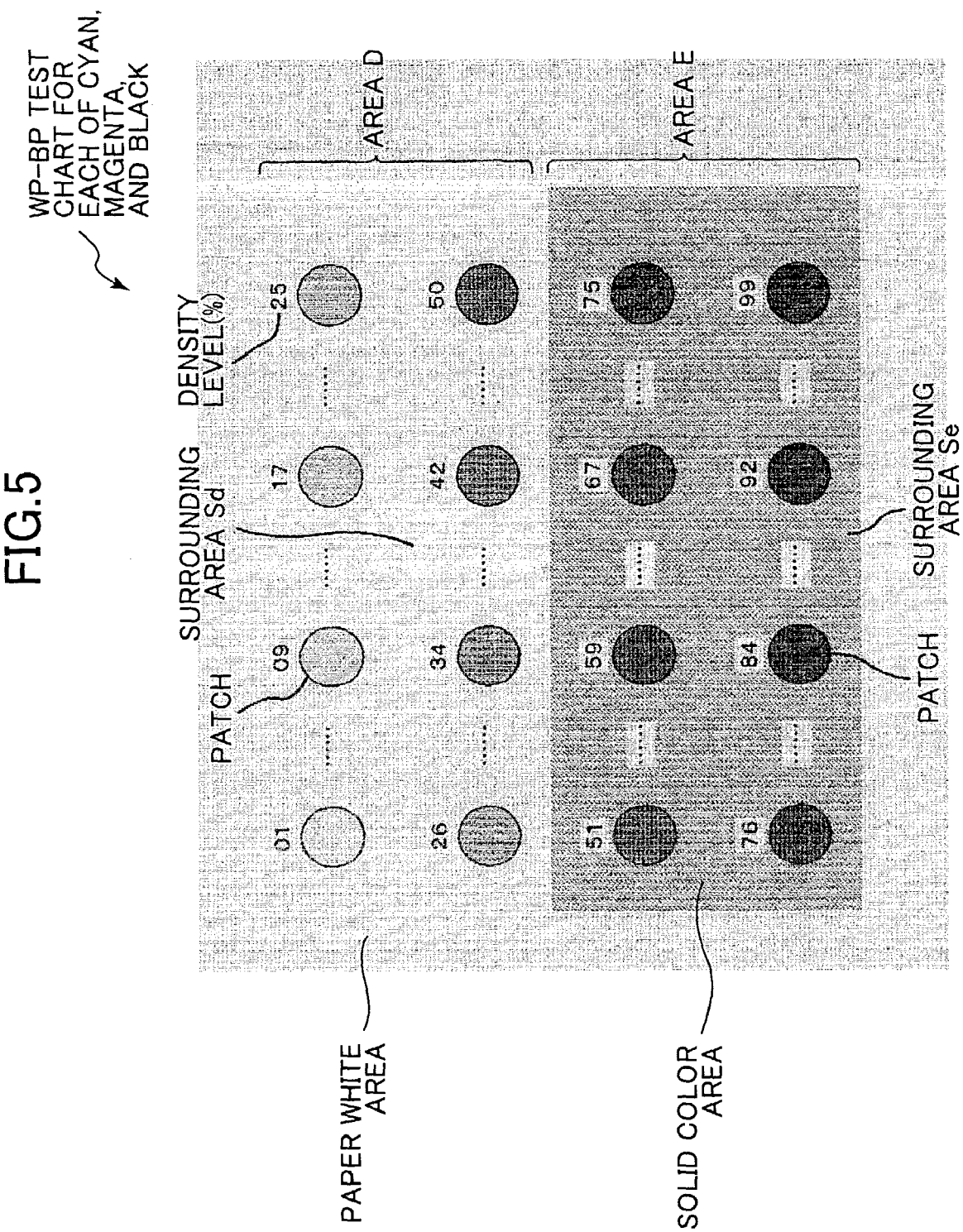
FIG. 5 is a schematic view showing a WP–BP test chart created for visually investigating values BP and WP relating to the output characteristic E of each of color agents of cyan, magenta, or black.

In order to determine the values WP and BP for cyan, the personal computer 1 controls the printer 2 to output a WP–BP test chart as shown in FIG. 5 on a print medium (white paper). Accordingly, the optical density of the white paper indicates the minimum density Dmin for cyan. The WP–BP test chart includes: area D for being used to determine the value WP; area E for being used to determine the value BP.

In the area D, a plurality of (50) cyan color patches are outputted. The color patches have circular shape and are formed of cyan color agent in density gradations that correspond to the dot percentages of 1% to 50%. In the area E, another plurality of (49) color patches are outputted. The color patches have circular shape and are formed of cyan color agent in density gradations that correspond to the dot percentages of 51% to 99%. The numerical value of the dot percentage is printed above each patch on the areas D and E.

It is noted that the dot percentage is defined for the density level of test data using the following equation (4):

$$(\text{Dot percentage}) = \{(\text{density level of test data})/(\text{maximum density level (255)})\} \times 100 \quad (4)$$

Accordingly, in order to print each color patch with a desired dot percentage, the computer 1 supplies a set of test data indicative of a density level indicated by the following equation (5);

$$(\text{Density level of test data}) = \{(\text{Dot percentage}) \times (\text{maximum density level (255)})\}/100 \quad (5)$$

In order to print all the 99 color patches with dot percentages of 1% to 99%, therefore, the computer 1 supplies 99 sets of test data with density levels of 1×255/100, 2×255/100, . . . , and 99×255/100.

In the area D, at the region Sd surrounding the color patches, no color agent is provided on the recording medium (paper sheet). In other words, the color agent is provided at the dot percentage of 0%. Accordingly, the white paper color of the surrounding region Sd indicates the minimum density Dmin for cyan.

In the area E, at the region Se surrounding the color patches, the cyan color agent is provided at the dot percentage of 100%. The 100% dot-percentage cyan color in the surrounding region Se indicates the maximum optical density Dmax for cyan. In other words, the optical density of cyan ink indicates the maximum optical density Dmax for cyan. The 100% dot-percentage cyan is provided uniformly entirely over the region Se. This 100%-dot-percentage (solid color) surrounding region Se is indicated by a shadow area in FIG. 5. In this way, the surrounding region Se is formed using the same color agent as the color agent used to form the patches.

It is noted that in order to print all the 50 color patches with dot percentages of 1% to 50% in area D, the computer 1 supplies the printer 2 with test data indicative of density levels of 1×255/100 to 50×255/100 for producing the 50 color patches In order to print all the 49 color patches with dot percentages of 51% to 99% and to print the surrounding area Se with dot percentage of 100%, the computer 1 supplies the printer 2 with: test data indicative of density levels of 51×255/100 to 99×255/100 for producing the 49 color patches; and test data indicative of the density level of 100×255/100 (=255) for producing the entire area Se surrounding the color patches.

The characteristic value WP is determined subjectively by the user viewing the area D. More specifically, the user visually compares the densities of the patches of 1% to 50% dot percentages with the density (Dmin) of the surrounding region Sd, and selects one patch that has the smallest difference in density from the surrounding region. In other words, the user selects one patch with the minimum density level where some difference can be seen between the patch and its surrounding area. This patch represents the density level where the difference in density is first visible compared to the surrounding region. The density level of test data that has created this patch can be assumed to be the level where color agent first starts being outputted, and so can be set as the value WP.

On the other hand, the characteristic value BP is determined subjectively by the user viewing the area E. More specifically, the user visually compares the densities of the patches of 51% to 99% dot-percentages with the density (Dmax) of the surrounding region Se, and selects one patch with the highest density level that shows some difference in optical density with the surrounding region Se. The density level of test data that has created this patch can be assumed to be the level where the cyan color agent starts being saturated, and can be set as the value BP.

Figure 6:
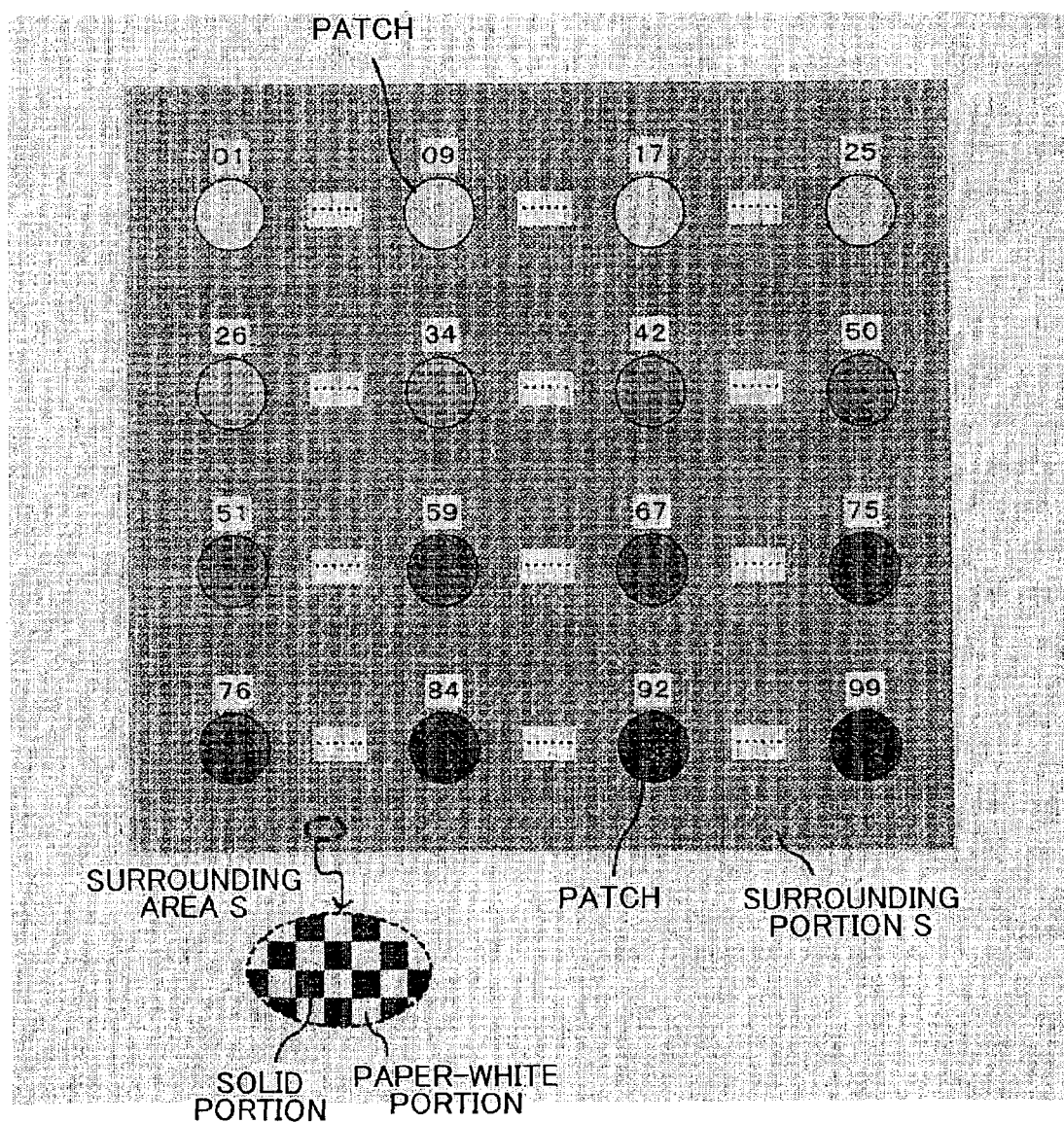
FIG. 6 is a schematic view showing a γ test chart created for visually investigating the value MP (γ) relating to the output characteristic E of each of color agents of cyan, magenta, or black.

In order to determine the characteristic value γ for cyan, the personal computer 1 controls the printer 2 to output a γ test chart shown in FIG. 6 on a print medium (white paper background). Therefore, the optical density of the white paper indicates the minimum density Dmin for cyan. In the γ test chart, a plurality of (99) color patches are outputted. The color patches have circular shape and are formed of cyan color agent in density gradations that correspond to the dot percentages of 1% to 99%. The numerical value of the dot percentage is printed above each patch.

At the region S surrounding the color patches, the cyan color agent is provided in a predetermined pattern (checker pattern, in this example). In this way, the surrounding region S is formed using the same color agent as the color agent used to form the patches. The 100% dot-percentage cyan is provided in the region S selectively in the predetermined pattern. More specifically, as indicated by the magnified partial view at the bottom of FIG. 6, cyan solid color regions (100% dot percentage regions) and white paper regions (0% dot percentage regions) are formed in alternation with a predetermined surface area ratio of the solid color regions relative to the white paper regions. The density of the white paper background regions indicates the minimum density Dmin for cyan, and the density of the 100% dot-percentage cyan in the cyan solid regions indicates the maximum density Dmax for cyan.

In this example, the surface area ratio of the cyan solid color regions to the white paper regions is set, taking into consideration the tendency of the color agent to spread through the print sheet, so that the optical density of the surrounding region S becomes about an output density of 50% (=(Dmax+Dmin)/2).

In order to suppress the influence of color agent spread to a minimum, the solid color regions and the white paper regions are formed roughly to a fineness of about 25 or less of each per inch. That is, 25 or less number of solid color regions and 25 or less number of white paper regions will be formed within every one inch length on the surrounding region.

It is noted that in order to print all the 99 color patches with dot percentages of 1% to 99% and to print the solid color regions in the checker pattern in the surrounding area S with dot percentage of 100%, the computer 1 supplies the printer 2 with: test data indicative of density levels of 1×255/100 to 99×255/100 for producing the 99 color patches; and test data indicative of the density level of 100×255/100 (=255) for producing the solid color regions in the checker pattern in the surrounding area S.

The characteristic value γ is determined subjectively by the user viewing the γ test chart. More specifically, the user visually compares the densities of the patches with the density ((Dmax+Dmin)/2) of the surrounding region S, and selects one patch that has the smallest difference in density from the surrounding region S. In other words, the user visually compares the patches with the surrounding region S. and selects one patch whose optical density is the nearest to the optical density of the surrounding region, and therefore which is the most difficult to distinguish from the surrounding region.

It is now assumed that the density level of test data that has created the selected patch is indicated as the value MP. In this case, it is known that when the density level MP is inputted to the printer 2, then the output density OD outputted by the printer 2 will be (Dmax+Dmin)/2.

Accordingly, by substituting "Level"=MP and "O.D"=(Dmax+Dmin)/2 in equation (2), the following equation (6) is obtained:

$$(Dmax+Dmin)/2=\{(MP-WP)/(BP-WP)\}^{\gamma} \cdot (Dmax-Dmin)+Dmin \quad (6).$$

By solving the equation (6), the value of γ can be determined as indicated in the following equation (7):

$$\gamma=(\log (1/2))/(\log \{(MP-WP)/(BP-WP)\}) \quad (7)$$

In this way, the values WP, BP, and γ can be determined by visually selecting the appropriate patches from the test charts. The output characteristic E of the printer 2 can be obtained based on the values WP, BP, and γ according to the equations (1)-(3). Based on the output characteristics E, the look up table LUT shown in FIG. 2 can be obtained in the manner described already.

The visual calibration method described above enables the user to simply perform a color calibration without using a colorimeter. The output characteristic E of each of the three colors of C, M, K is investigated individually. That is, the above-described series of operations are performed separately there times to determine the output characteristics E of C, M, and K colors.

It is noted, however, that it is quite difficult to visually detect difference in densities of yellow because yellow is a color agent with low visual sensitivity. Therefore, it is difficult to investigate output characteristic E of yellow if the test charts were printed by yellow as shown in FIGS. 5 and 6 in the same manner as described above for cyan, magenta, and black.

Figure 7:
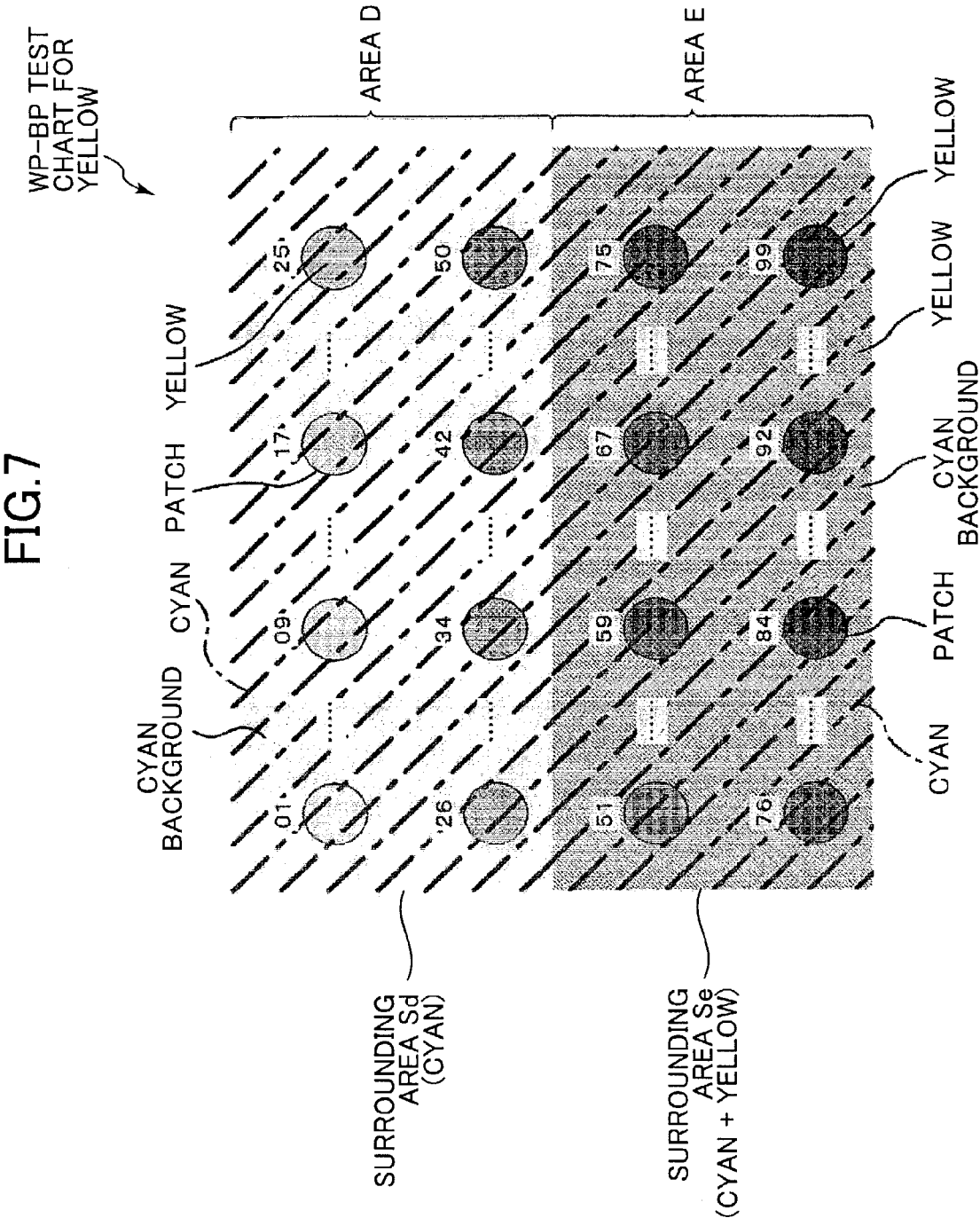
FIG. 7 is a schematic view showing a WP–BP test chart created for visually investigating values BP and WP relating to the output characteristic E of yellow color agent.

According to the present embodiment, therefore, in order to determine the values WP and BP for yellow, the personal computer 1 controls the printer 2 to output a WP–BP test chart shown in FIG. 7. In order to determine the characteristic value γ for yellow, the personal computer 1 controls the printer 2 to output a γ test chart shown in FIG. 8.

The WP–BP test chart and the γ test chart for each of cyan, magenta, and black is formed by using the corresponding color agent only. Contrarily, the WP–BP test chart and the γ test chart for yellow are formed by using not only the yellow color agent but also the cyan color agent.

More specifically, the WP–BP test chart and the γ test chart for each of cyan, magenta, and black are formed on the surface of the white paper surface. Contrarily, the WP–BP test chart and the γ test chart for yellow are formed on a solid (100% dot-percentage) cyan color background that is provided or coated on the entire white paper surface. Except for this point, the WP–BP test chart and the γ test chart for yellow are the same as the WP–BP test charts and the γ test charts for cyan, magenta, and black.

Next, the WP–BP test chart for yellow will be described in greater detail with reference to FIG. 7.

The WP–BP test chart for yellow is formed by providing cyan color agent at a uniform maximum density level (100% dot percentage) over the entire surface of a sheet (white paper) for the WP–BP test chart. Accordingly, 100%-dot percentage (solid) cyan is provided on the entire background of the WP–BP test chart. The 100%-dot percentage cyan density in the background of the WP–BP test chart indicates the minimum density Dmin for yellow. In other words, the optical density of cyan ink indicates the minimum density Dmin for yellow.

In the same manner as the WP–BP test chart for cyan, the WP–BP test chart for yellow includes: area D for being used to determine the value WP; and area E for being used to determine the value BP.

In the area D, a plurality of (50) color patches are formed from the yellow color agent. The color patches have circular shape and are formed of yellow color agent in density gradations that correspond to the dot percentages of 1% to 50%. In this way, the plurality of (50) yellow-color patches are provided on top of the solid cyan-color background. The numerical value of the dot percentage is printed above each patch on the area D.

At the region Sd surrounding the color patches in the area D, no yellow color agent is provided on the cyan color background. In other words, the yellow color agent is provided at the dot percentage of 0%, that is, at the optical density Dmin.

Accordingly, in the area D, the cyan color agent at a density level of 100% serves as the background to indicate the optical density Dmin of yellow. This background region is indicated by single-dot hatching in FIG. 7. The patches in area D are formed by overlapping yellow color agent onto the cyan color agent. The yellow color agent is formed at dot percentages of 1 to 50% on the 100% dot-percentage cyan background. Accordingly, each patch is formed by the mixture of the 100% density level cyan color agent and some gradation of density level yellow color agent from 1 to 50%. Therefore, the patches gradually shift from cyan to blue green in color.

It is noted that in order to print the background with dot percentage of 100% for cyan and to print all the 50 color patches with dot percentages of 1% to 50% for yellow, the computer 1 supplies the printer 2 with: cyan test data indicative of the density level of 100×255/100 (=255) for producing the entire background, and yellow test data indicative of density levels of 1×255/100 to 50×255/100 for producing the 50 color patches.

In the area E, another plurality of (49) color patches are formed from yellow color agent. The color patches have circular shape and are formed of yellow color agent in density gradations in the dot percentages of 51% to 99%. The numerical value of the dot percentage is printed above each patch on the area E. In this way, the plurality of (49) color patches of yellow are provided on top of the 100% dot-percentage (solid) cyan background.

In the area E, at the region Se surrounding the color patches, the yellow color agent is also provided at the dot percentage of 100%. In other words, 100% dot-percentage cyan is provided uniformly entirely over the region Se, and 100% dot-percentage yellow is provided uniformly entirely over the region Se on top of cyan. Accordingly, the region Se surrounding the color patches is formed by the mixture of the 100%-dot-percentage (solid) cyan and the 100%-dot-percentage (solid) yellow, and therefore appears green.

Accordingly, in the area E, the surrounding portion Se is formed from cyan color agent at a density level of 100% (indicated by single-dot hatching in FIG. 7) and yellow color agent at a density level of 100% (indicated by shadow area in FIG. 7). The resultant density of the mixture of the 100% dot-percentage (solid) cyan and the 100% dot-percentage (solid) yellow in the surrounding area Se indicates the maximum density Dmax for yellow. In other words, the optical density of the mixture of cyan ink and yellow ink indicates the maximum density Dmax for yellow.

The patches in the area E are formed by overlapping yellow color agent at gradations in the dot-percentages of 51 to 99% onto the 100% dot-percentage cyan color background. Accordingly, each patch is formed from the mixture of the 100% density level cyan color agent and some gradation of density-level yellow color agent from 51 to 99%. Therefore, the patches gradually shift from blue green to green in color.

To summarize, in area E, cyan and yellow color agents are both provided at density levels of 100% at positions other than where the patches are to be formed. At the patch positions, cyan color agent is provided at a density level of 100% and yellow color agent is provided at density levels that differ for each patch.

It is noted that in order to print the background with dot percentage of 100% for cyan, to print all the 49 color patches with dot percentage of 51% to 99% for yellow, and to print the surrounding area Se with dot percentage of 100% for yellow, the computer 1 supplies the printer 2 with: cyan test data indicative of the density level of 100×255/100 (=255) for producing the entire background, yellow test data indicative of density levels of 51×255/100 to 99×255/100 for producing the 50 color patches, and yellow test data indicative of the density level of 100×255/100 (=255) for producing the entire area Se surrounding the color patches.

The characteristic value WP is determined subjectively by the user viewing the area D in the same manner as for cyan. More specifically, the user compares the patches and their surrounding area Sd visually, and selects one patch with the minimum density level where some difference can be seen between the patch and its surrounding area. This patch represents the density level where the difference in density is first visible compared to the surrounding area. Accordingly, the density level of test data that has created this patch can be assumed to be the level where yellow color agent first starts being outputted, and so can be set as the value WP.

The characteristic value BP is determined subjectively by the user viewing the area E. More specifically, the user visually compares the patches and the surrounding area Se and selects the patch with the maximum density level where some difference between its optical density and that of the surrounding area Se can be observed. The density level of test data that has created this patch can be assumed to be the level where the yellow color agent starts being saturated, and can be set as the value BP.

Next, the γ test chart for yellow will be described below in greater detail with reference to FIG. 8.

Figure 8:
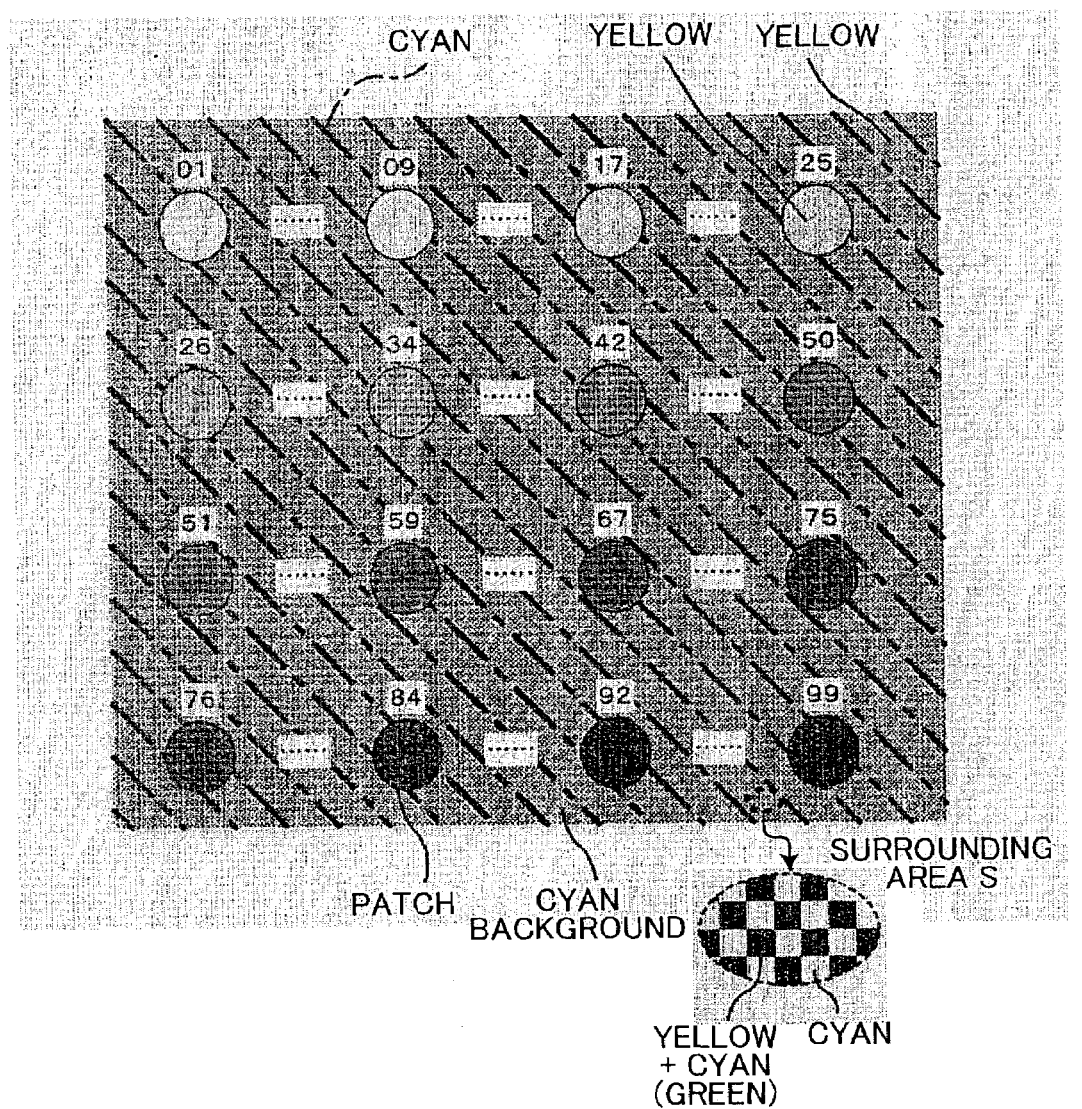
FIG. 8 is a schematic view showing a γ test chart created for visually investigating the value MP (γ) relating to the output characteristic E of yellow color agent.

The γ test chart for yellow is formed by outputting cyan color agent at a uniform maximum density level (100% dot percentage) over the entire surface of a sheet (white paper) for the γ test chart as indicated by single-dot chain line in FIG. 8. Accordingly, 100%-dot percentage (solid) cyan is provided on the entire background of the γ test chart, and therefore the 100%-dot percentage (solid) cyan density indicates the minimum density Dmin for yellow, A plurality of (100) color patches are provided on top of the 100% dot-percentage (solid) background. The color patches have circular shape and are formed of yellow color agent in density gradations of the dot percentages of 1% to 99%. The numerical value of the dot percentage is printed above each patch. Accordingly, the patches are produced in graduations from cyan to green by yellow color agent at densities of 1% to 99% overlapped on the cyan at the uniform density of 100% in the background.

At the region S surrounding the color patches, yellow color agent with 100% dot-percentage (solid region) is provided in a predetermined pattern (checker pattern, in this example) on the 100% dot-percentage cyan background. In other words, cyan is provided uniformly entirely over the surrounding area S and yellow is provided in the surrounding area S on top of cyan selectively in the predetermined pattern. As indicated by the magnified partial view at the bottom of FIG. 8, green solid regions (100% dot-percentage for cyan +100% dot-percentage for yellow) and cyan background regions (100% dot-percentage for cyan) are formed in alternation with a predetermined surface area ratio of the green pattern regions relative to the cyan background regions. The density of the 100%-dot percentage (solid) cyan in the cyan background regions indicates the minimum density Dmin for yellow, and the resultant density of the mixture of the 100% dot-percentage cyan and the 100% dot-percentage yellow in the green solid regions indicates the maximum density Dmax for yellow.

In this example, the surface area ratio of the green pattern regions to the cyan background regions is set, taking into consideration the tendency of the yellow color agent to spread through the print sheet, so that the optical density of the surrounding area S is about an output density of 50% =(Dmax+Dmin)/2 for yellow.

In order to suppress the influence of yellow color agent spread to a minimum, the green regions (100% yellow density regions) and the cyan regions (0% yellow density regions) are formed roughly to a fineness of about 25 or less of each per inch. That is, 25 or less number of green patterns and 25 or less number of cyan regions will be formed within every one inch length on the background.

In this way, the entire print surface, with the exception of the patch areas, is coated uniformly with cyan at a density of 100% and is coated with yellow at a density of 100% in the form of checker pattern. Patch regions are coated with cyan at the density of 100% density and with yellow at various densities.

It is noted that in order to print the background with dot percentage of 100% for cyan, to print all the 99 color patches with dot percentages of 1% to 99% for yellow, and to print the surrounding area S with dot percentage of 100% for yellow to provide the green solid regions in the checker pattern, the computer 1 supplies the printer 2 with: cyan test data indicative of the density level of 100×255/100 (=255) for producing the entire background, yellow test data indicative of density levels of 1×255/100 to 99×255/100 for producing the 99 color patches; and yellow test data indicative of the density level of 100×255/100 (=255) for producing the green solid regions in the checker pattern in the area S surrounding the color patches.

The characteristic value γ is determined subjectively by the user viewing the γ test chart. More specifically, the user visually compares the densities of the patches with the density ((Dmax+Dmin)/2) of the surrounding area S, and selects one patch that has the smallest difference in density from the surrounding area. In other words, the user visually compares the patches with the surrounding area S, and selects one patch whose optical density is the nearest to the optical density of the surrounding area S, and therefore which is the most difficult to distinguish from the surrounding area S.

It is now assumed that the density level of the test data that has created the selected path is indicated as the value MP. In this case, the value of γ can be determined according to the equation (7).

In this way, the values WP, BP, and γ for yellow color can be determined by visually selecting the appropriate patches from the test charts. The output characteristic E of the yellow of the printer 2 can be determined based on the values WP, BP, and γ. Based on the output characteristics E, the look up table LUT shown in FIG. 2 can be obtained in the manner already described.

As described above, according to the present embodiment, in the test charts to be used for investigating the output characteristic E of yellow color agent, the personal computer 1 controls the printer 2 to produce a plurality of patches by outputting yellow color agent in a plurality of densities and by outputting cyan color agent in a fixed density in an overlapping condition. Accordingly, the patches are formed by the mixture of the density-changing yellow color agent and the density-fixed cyan color agent. The patches are therefore formed in gradations from cyan to green. Accordingly, the plurality of patches in the plural density levels are easier to distinguish than when the patches are formed from yellow color agent only. Accordingly, visual calibration can be easily performed even with the yellow color agent that has a low visual sensitivity.

Additionally, the region Sd of the area D surrounding the patches is formed in the fixed density of cyan color agent, and the region Se of the area E surrounding the patches is formed in the mixture of the fixed density of cyan color agent and the fixed density of yellow color agent. The region S of the γ test chart surrounding the patches is formed in the pattern of the fixed density of yellow color agent on top of the fixed density of cyan color agent background. Accordingly, it is possible to accurately determine the values WP, BP and γ of the yellow color agent.

In the background of the test charts for yellow, cyan color agent is provided at the maximum density (100%). Accordingly, the background is less susceptible to dot gain, but the output density of cyan can be made stable relatively easily. It is ensured that calibration can always be performed under the same conditions.

Among all the color agents (cyan, magenta, yellow, and black) used in the printer 2, hue of cyan is the nearest to the hue of blue, which is the opposite color of yellow. Accordingly, mixing yellow with cyan can obtain the higher visually sensible color than mixing yellow with other colors.

As described above, according to the present embodiment, when forming test charts for investigating output characteristics relating to yellow color agent, the printer 2 outputs yellow color agent in a plurality of densities that correspond to various density levels and also outputs cyan color agent in a fixed and maximum density. Patches in gradations from cyan to green are formed by overlapping the yellow color agent and the cyan color agent. The patches are formed with respect to a surrounding area that is formed by outputting the cyan color agent in the fixed and maximum density. Accordingly, the colors of the patches are easier to distinguish than when the patches are formed from yellow only. Visual calibration can be easily performed even with the yellow color agent that has a low visual sensitivity.

Figure 9:
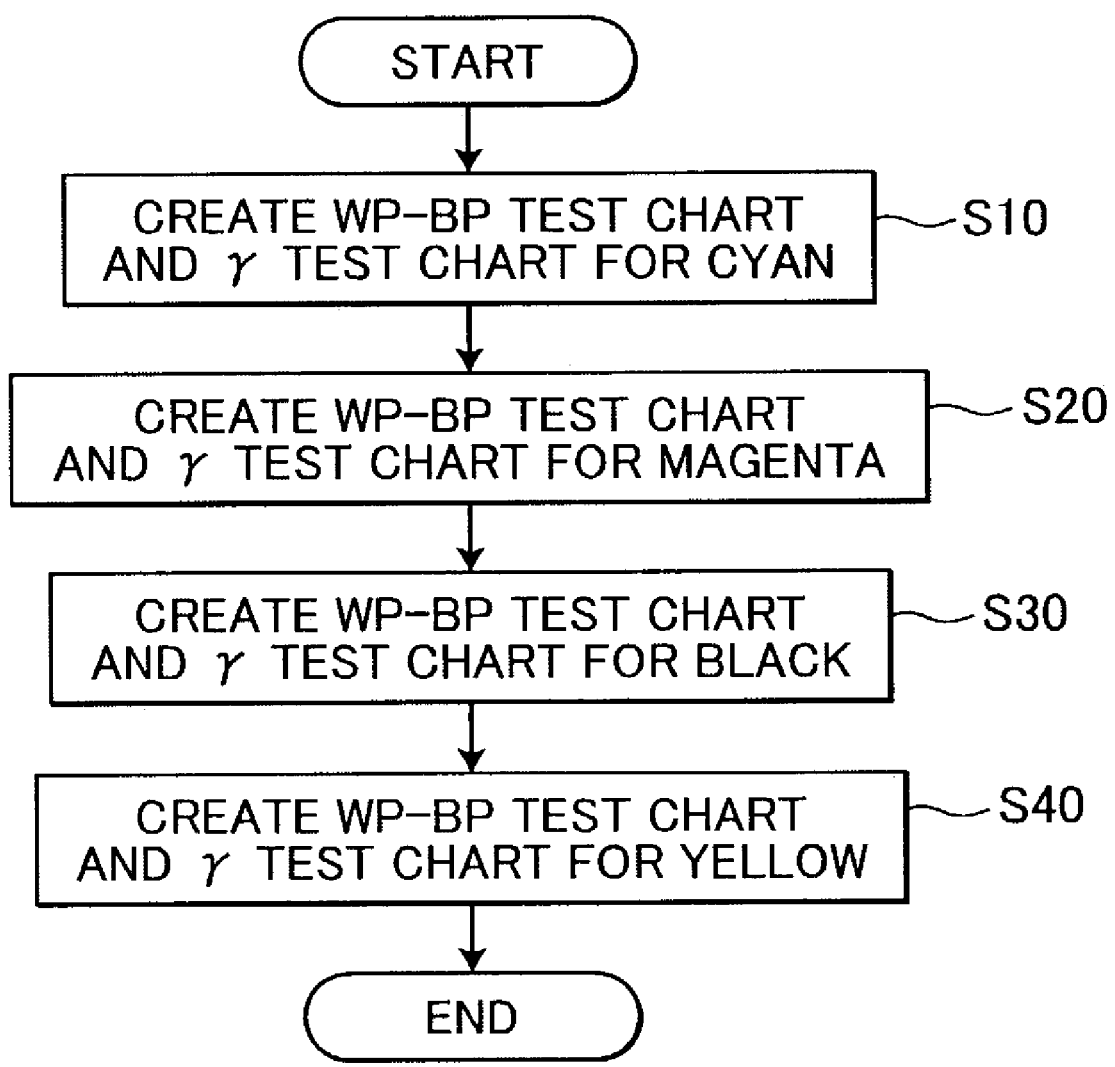
FIG. 9 is a flowchart of a patch forming process executed by the patch forming device of the present embodiment.

According to the present embodiment, the CPU 11 in the computer 1 executes the patch forming program to attain the patch forming process as shown in FIG. 9.

First, in S10, the CPU 11 creates test data for producing the WP–BP test chart of FIG. 5 for cyan, and test data for producing the γ test chart of FIG. 6 for cyan, and supplies the test data to the printer 2, whereupon the printer 2 creates the WP–BP test chart of FIG. 5 and the γ test chart of FIG. 6 for cyan.

Next, in S20, the CPU 11 creates test data for producing the WP–BP test chart of FIG. 5 for magenta, and test data for producing the γ test chart of FIG. 6 for magenta, and supplies the test data to the printer 2, whereupon the printer 2 creates the WP–BP test chart of FIG. 5 and the γ test chart of FIG. 6 for magenta.

Next, in S30, the CPU 11 creates test data for producing the WP–BP test chart of FIG. 5 for black, and test data for producing the γ test chart of FIG. 6 for black, and supplies the test data to the printer 2, whereupon the printer 2 creates the WP–BP test chart of FIG. 5 and the γ test chart of FIG. 6 for black.

Next, in S40, the CPU 11 creates test data for producing the WP–BP test chart of FIG. 7 for yellow, and test data for producing the γ test chart of FIG. 8 for yellow, and supplies the test data to the printer 2, whereupon the printer 2 creates the WP–BP test chart of FIG. 7 and the γ test chart of FIG. 8 for yellow.

Then, the patch forming process ends.

In the above description, the test charts for cyan, magenta, black, and yellow are prepared in this order. However, the test charts for cyan, magenta, black, and yellow may be prepared in other orders.

Figure 10:
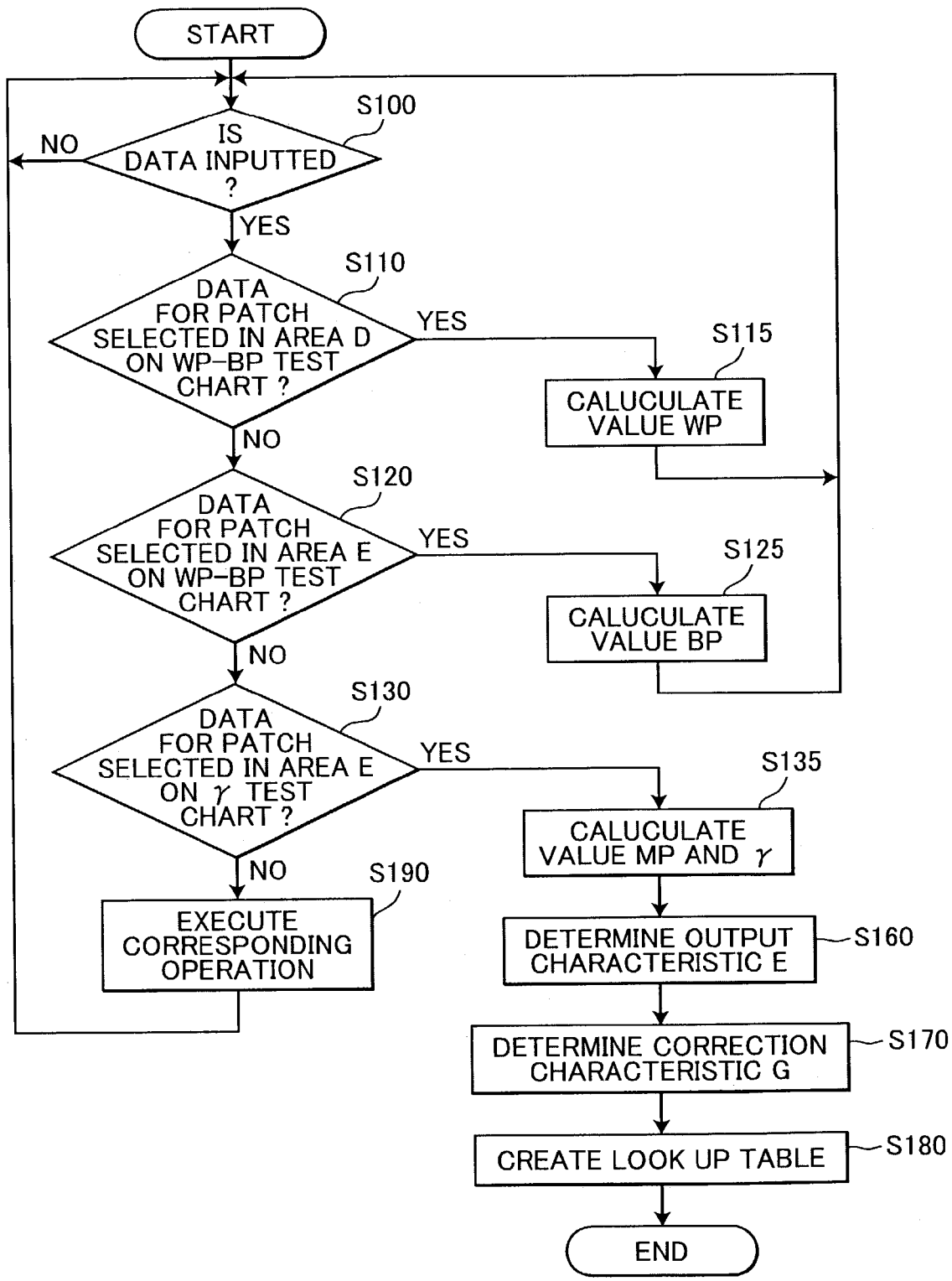
FIG. 10 is a flowchart of a look up table preparing process executed by the patch forming device of the present embodiment.

After completing the patch forming process, the CPU 11 starts executing the LUT preparing program as shown in FIG. 10. The CPU 11 executes the LUT preparing program four times, thereby preparing the LUTs for the four colors of cyan, magenta, black, and yellow. It is noted, however, that it is unnecessary to execute the LUT preparing processes in the order of cyan, magenta, black, and yellow. The LUT preparing processes for cyan, magenta, black, and yellow may be executed in various orders.

Next description will be given for the case where the CPU 11 prepares the look up table for yellow. However, the CPU 11 prepares the look up tables for cyan, magenta, and black in the same manner as for yellow.

It is noted that the user views the area D on the WP–BP test chart and inputs his/her observation result, views the area E on the WP–BP test chart and inputs his/her observation result, and views the $\gamma$ test chart and inputs his/her observation result, in this order.

When the CPU 11 receives some data from the input device 20 (yes in S100), the program proceeds to S110.

Viewing the area D on the WP–BP test chart for yellow (FIG. 7), the user selects one patch that has the smallest difference in density from the surrounding region Sd. The user manipulates the input device 20 to input the value of the dot-percentage (%) that is printed above his/her selected patch on the area D. When the CPU 11 determines in S110 that the user inputs the value of the dot-percentage (%) of the user's selected patch on area D for yellow (yes in S110), the CPU 11 calculates in S115 the density level that corresponds to the inputted dot-percentage number by calculating the equation (5), and sets the calculated value as the value WP relating to the output characteristic E of the yellow color agent.

Viewing the area E on the WP–BP test chart for yellow (FIG. 7), the user selects one patch with the maximum density level that has some difference in density from the surrounding region Se. The user manipulates the input device 20 to input the value of the dot-percentage (%) that is printed above his/her selected patch on the area E. When the CPU 11 determines in S120 that the user inputs the value of the dot-percentage (%) of the user's selected patch on area E for yellow (yes in S120), the CPU 11 calculates in S125 the density level that corresponds to the inputted dot-percentage number by calculating the equation (5), and sets the calculated value as the value BP relating to the output characteristic E of the yellow color agent.

Viewing the $\gamma$ test chart for yellow (FIG. 8), the user selects one patch that has the smallest difference in density from the surrounding region S. The user manipulates the input device 20 to input the value of the dot-percentage (%) that is printed above his/her selected patch on the $\gamma$ test chart. When the CPU 11 determines in S130 that the user inputs the value of the dot-percentage (%) of the user's selected patch on the $\gamma$ test chart for yellow (yes in S130), the CPU 11 calculates in S135 the density level that corresponds to the inputted dot-percentage number by calculating the equation (5), and sets the calculated value as the value MP relating to the output characteristic E of the yellow color agent. Also in S135, the CPU 11 calculates the equation (7) to determine the value $\gamma$ for yellow.

Thereafter, in S160, the CPU 11 creates the curve approximating the output characteristic E for yellow, as shown in FIG. 4, based on the determined values WP, BP, and $\gamma$ according to the equations (1)-(3).

Figure 3:
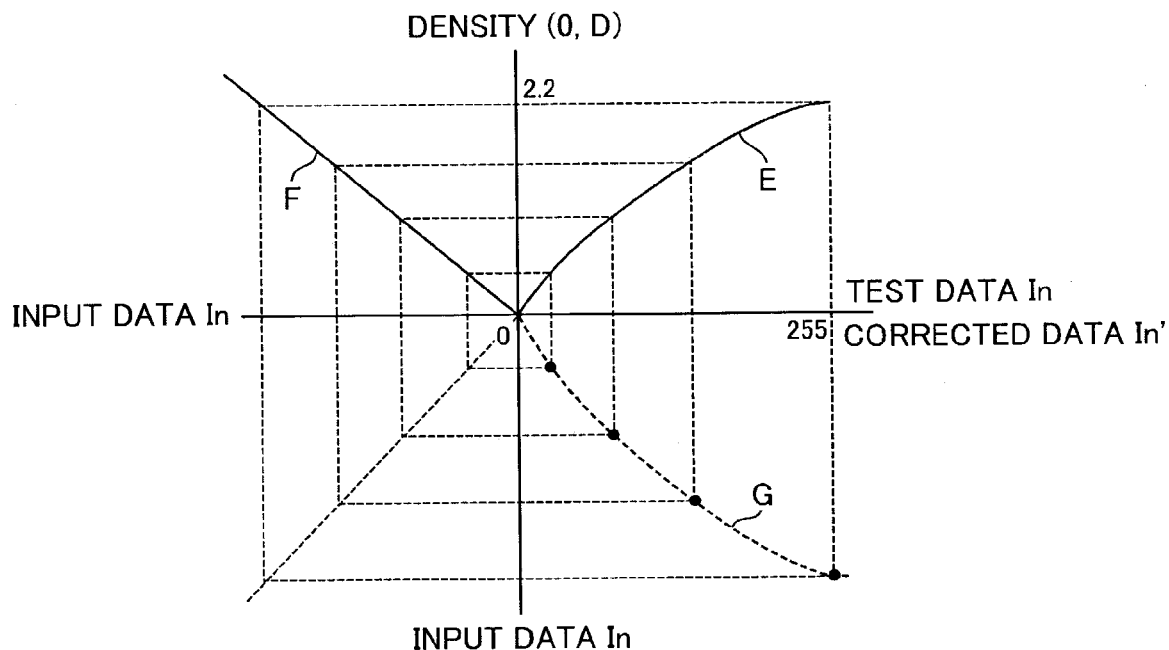
FIG. 3 is a graph of an output characteristic curve E representing relationship between test data and density, an ideal characteristic curve F representing relationship between input data and density, and a correction characteristic curve G representing relationship between input data and test data (corrected data)

Then, in S170, the CPU 11 creates the curve indicative of the correction characteristic G for yellow as shown in FIG. 3 based on the output characteristic E for yellow.

Then, in S180, the CPU 11 creates the look up table (FIG. 2) for yellow by listing up the values In (Yin) of 0 to 255 appearing in the vertical axis for the curve G (FIG. 3) on the first column, and by listing up the values In' (Yin') appearing in the horizontal axis for the curve G on the second column. The CPU 11 stores data of the look up table in the hard disk device 14. Then, the process ends.

On the other hand, if the data inputted via the input device 20 is data other than those data for the user's selected patches (no in S130), operation corresponding to the inputted data is executed in S190, and the process returns to S100.

The CPU 11 executes the above-described look up table preparing process also for cyan, magenta, and black in the same manner as described above.

After preparing the LUTs for all the colors of cyan, magenta, black, and yellow, when the CPU 11 receives input data (Cin, Min, Yin, Kin) indicative of a desired image from a high-order program, the CPU 11 retrieves the look up tables for cyan, magenta, yellow, and black from the hard disk device 14, and converts the input data (Cin, Min, Yin, Kin) into corrected input data (Cin', Min', Yin', Kin') by referring to the look up tables. By supplying the corrected input data (Cin', Min', Yin', Kin') and a print command to the printer 2, the CPU 11 controls the printer 2 to print the desired image that can reproduce the density represented by the original input data (Cin, Min, Yin, Kin).

In this way, according to the present embodiment, when printing is performed, the density levels of input data included in the print data from the high-order program are converted into density levels of corrected data. Then, the converted density levels are sent to the printer 2. As a result, the density levels measured from a printed matter that is printed by the printer 2 will match the density levels included in the print data received from the higher order program.

As described above, according to the present embodiment, by mixing the cyan color agent to the yellow color agent in the test charts for yellow, it is possible to obtain a color with higher visual sensitivity than when using the yellow color agent only. That is, the patch forming device 1 outputs yellow so as to overlap with cyan that is outputted at the predetermined density. Accordingly, a plurality of patches corresponding to different density levels can be formed from color that has a higher visual sensitivity than yellow. Accordingly, the color of the patches is easier to distinguish than when the plurality of patches corresponding to the different density levels are formed from yellow only.

Also, because cyan is outputted in a fixed density, the colors of the plurality of patches change according to changes in the density of yellow. Accordingly, by visually observing the colors of the patches, the output characteristics of yellow can be investigated. It is noted that in order to output cyan, a completely-fixed density level may not be supplied to the printer 2. It is sufficient to supply the printer with a density level that indicates a substantially fixed density and that causes the printer 2 to output color whose density appears to be substantially fixed when observed by the naked eye.

Moreover, according to the present embodiment, the background not only for the patches but also for the patch-surrounding area is formed by outputting cyan in a fixed density. Accordingly, the rising edge WP of yellow can be determined even if the density adjustment for cyan has been attained imperfect. Therefore, the density adjustment of yellow can be performed accurately. Also, saturation point BP of the density and the exponent (index) $\gamma$ representative of the curve from the rising edge WP to the saturation point BP of the density can be determined accurately even if the density calibration of cyan has not been perfectly performed.

According to the present embodiment, the patch forming device 1 outputs cyan in the maximum density for the test charts for yellow. There will be little fluctuation when the output density is at maximum. Therefore, the output density of cyan can be made relatively stable so that calibration for yellow can always be performed under the same conditions.

Among the plurality of color agents (cyan, magenta, black, and yellow) that the image forming device 2 can output, cyan is the color agent that has a hue nearest to that of an opposite color (blue) of yellow. Here, "opposite color" for some color is defined as a color that produces an achromatic color when the opposite color is mixed with the subject color. Accordingly, when cyan overlaps yellow, a color with the higher visual sensitivity can be obtained than when magenta or black overlaps yellow. By overlapping cyan on yellow, it is possible to distinguish the color of the patches more easily than when overlapping the other colors on yellow.

While the invention has been described in detail with reference to the specific embodiment thereof, it would be apparent to those skilled in the art that various changes and modifications may be made therein without departing from the spirit of the invention.

For example, in the above-described embodiment, in the test charts for yellow, cyan color agent is formed in the maximum and fixed density (100% dot percentage) in the background for both the patches and the surrounding area. However, cyan color agent need not be formed at the maximum density, but may be formed at some intermediate density. As long as the cyan color agent is provided in a fixed density in the background for both the color patches and their surrounding area, then the resultant mixture of the yellow color agent and the cyan color agent will appear in a color with a higher visual sensitivity than yellow color agent alone. Because the amount at which the cyan color agent is to be mixed is fixed, no adverse influence will be applied to the visible observation of the density level of the yellow color agent.

In the above-described embodiment, yellow color agent is mixed with cyan color agent in order to enhance the visual sensitivity of yellow. However, various colors other than cyan may be mixed with yellow color. For example, magenta color agent can be mixed with the yellow color agent, thereby obtaining red color that has higher visual sensitivity than does yellow.

If the plurality of color agents that the printer 2 can output include orange color agent and cyan color agent, then in order to prepare test charts for investigating orange color, the orange color agent may be mixed with cyan color agent in the same manner as the above-described embodiment for investigating yellow. When orange color agent and cyan color agent are mixed together, yellow green is produced and yellow green has a higher visual sensitivity than does orange.

Figure 11:
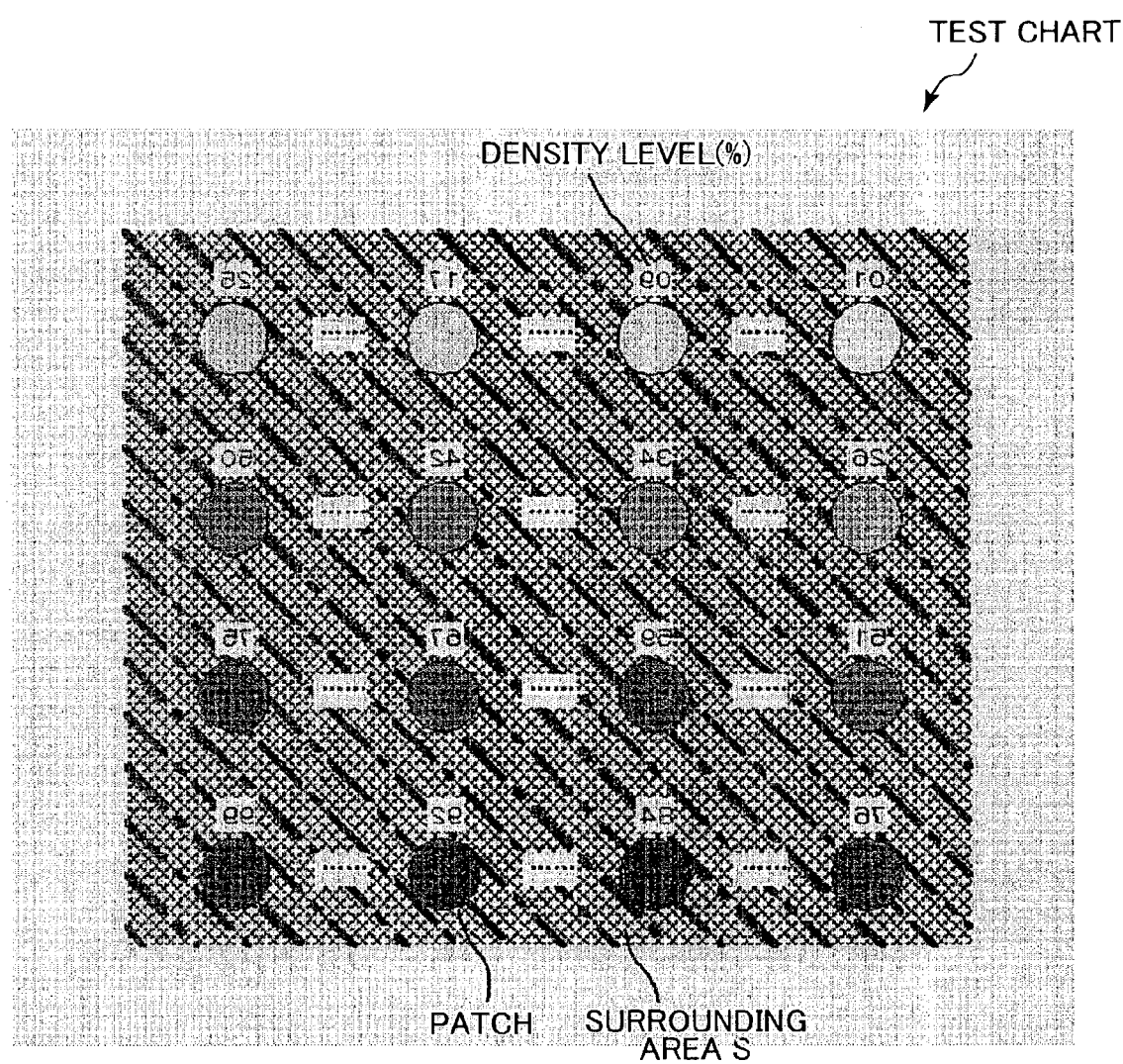
FIG. 11 is a test chart according to a modification of the embodiment.

When viewing each test chart, there is a possibility that the patches and the surrounding area may be difficult to compare because of influence from the print dots. Therefore, it is advantageous to view the test chart from the rear side of the print sheet, that is, from the sheet surface opposite that on which the test chart is actually printed. In order to make the chart easier to view when viewed from behind in this manner, as shown in FIG. 11, it is preferable to print the characters that designate the dot-percentages of the patches in reverse in the horizontal direction.

In the embodiment described above, the ink jet printer 2 is used as an example of an image forming device. However, any recording method, such as a laser printing method, can be used. Any image forming device that uses a plurality of color agents can form the patches under control by the patch forming device 1 of the embodiment.

In the embodiment described above, the image forming device 2 and the patch forming device 1 are configured from separate devices (computers) connected by the interfaces. However, the printer 2 can be incorporated with the function of the patch forming device 1.

Data of the patch forming program and the LUT preparing program may not be stored in the ROM 12, but may be stored in the hard disk device 14. Data of the patch forming program and the LUT preparing program may be stored in other various types of storage medium, such as a CD-ROM, a magneto-optical disk, or the like, and may be loaded into the computer. Data of the patch forming program and the LUT preparing program may be downloaded into the computer from a network, such as the Internet.

What is claimed is:

1. A patch forming device for forming a plurality of color patches to be used for determining output characteristics of an image forming unit that can form images using a plurality of different color agents, the patch forming device comprising:

a patch-data supplying portion supplying, an image forming unit that can form images using a plurality of different color agents, with patch-data for forming a plurality of color patches by a first color agent and a second color agent among the plurality of color agents, the second color agent being different from the first color agent, the patch-data including first patch-data indicative of a plurality of different levels of color density for the first color agent and second patch-data indicative of a fixed level of color density for the second color agent, thereby causing the image forming unit to output a plurality of different color patches on a recording medium, each color patch being formed of mixture of the first color agent in a corresponding density and the second color agent in the fixed density, the mixture of the first color agent and the second color agent having visual sensitivity higher than the first color agent;

a surrounding-area-data supplying portion supplying the image forming unit with surrounding-area-data indicative of the fixed level of color density for the second color agent, thereby causing the image forming unit to form a surrounding-area image with the fixed density of the second color agent on the recording medium at a surrounding area that is defined around the plurality of color patches;

an input portion enabling a user to input his/her visual observation result of the plurality of color patches and the surrounding-area image on the recording medium; and a calculating portion calculating output characteristics of the image forming unit for the first color agent based on the inputted observation result.

2. A patch forming device as claimed in claim 1, further comprising a table creating portion creating, based on the created output characteristics for the first color agent, a correction table indicative of relationship between data indicative of the plurality of different levels of color density for the first color agent and corrected data indicative of a plurality of corrected different levels of color density for the first color agent.

3. A patch forming device as claimed in claim 1, wherein the image forming unit is capable of receiving data of a plurality of levels of color density for each color agent, the plurality of levels of color density including a predetermined maximum level of color density, the second patch-data and the surrounding-area data indicating the maximum level of color density for the second color agent.

4. A patch forming device as claimed in claim 1, wherein the surrounding-area-data includes first surrounding-area-data indicative of a first fixed level of color density for the first color agent and second surrounding-area-data indicative of a second fixed level of color density for the second color agent, thereby causing the image forming unit to form the surrounding-area image from the first color agent in the first fixed density and the second color agent in the second fixed density.

5. A patch forming device as claimed in claim 4, wherein the first and second surrounding-area-data indicates the first fixed density of the first color agent and the second fixed density of the second color agent to be provided entirely over the surrounding area as being overlapped one on the other.

6. A patch forming device as claimed in claim 4, wherein the first and second surrounding-area-data indicates forming the second fixed density of the second color agent over the entire surrounding area, while forming the first fixed density of the first color agent at a predetermined pattern on the surrounding area.

7. A patch forming device as claimed in claim 1, wherein the second color agent has hue that is nearest to that of an opposite color of the first color agent among the plurality of color agents.

8. A patch forming device as claimed in claim 1, wherein the plurality of color agents include yellow color agent and cyan color agent, the first color agent being the yellow color agent and the second color agent being the cyan color agent.

9. A patch forming device as claimed in claim 1, wherein the plurality of color agents include yellow color agent and magenta color agent, the first color agent being the yellow color agent and the second color agent being the magenta color agent.

10. A patch forming device as claimed in claim 1, wherein the plurality of color agents include orange color agent and cyan color agent, the first color agent being the orange color agent and the second color agent being the cyan color agent.

11. A patch forming device as claimed in claim 1, further comprising the image forming unit.

12. A patch forming device as claimed in claim 1, further comprising a connecting portion connected with the image forming unit.

13. A computer-readable medium storing a patch forming program to be executed by a computer to form a plurality of color patches to be used for determining output characteristics of an image forming unit that can form images using a plurality of different color agents, the program comprising:
   a patch-data supplying program supplying, an image forming unit that can form images using a plurality of different color agents, with patch-data for forming a plurality of color patches by a first color agent and a second color agent among the plurality of color agents, the second color agent being different from the first color agent, the patch-data including first patch-data indicative of a plurality of different levels of color density for the first color agent and second patch-data indicative of a fixed level of color density for the second color agent, thereby causing the image forming unit to output a plurality of different color patches on a recording medium, each color patch being formed of mixture of the first color agent in a corresponding density and the second color agent in the fixed density, the mixture of the first color agent and the second color agent having visual sensitivity higher than the first color agent;
   a surrounding-area-data supplying program supplying the image forming unit with surrounding-area-data indicative of the fixed level of color density for the second color agent, thereby causing the image forming unit to form a surrounding-area image with the fixed density of the second color agent on the recording medium at a surrounding area that is defined around the plurality of color patches;
   an inputting program enabling a user to input his/her visual observation result of the plurality of color patches and the surrounding-area image on the recording medium; and
   a calculating program calculating output characteristics of the image forming unit for the first color agent based on the inputted observation result.

14. A patch forming device for forming a plurality of color patches to be used for determining output characteristics of an image forming unit, the images being formed from a plurality of different color agents, the patch forming device comprising:
   (a) a patch-data supplying portion that supplies patch-data to an image forming unit, wherein:
      the patch-data comprises a first color agent and a second color agent, the second color agent being from a different color family from the first color agent and the combination of the first color agent and the second color agent having a visual sensitivity higher than the first color agent;
      the first color agent being indicative of a plurality of different levels of color density and the second color agent being indicative of a fixed level of color density for the second color agent;
      the patch-data is used by the image forming unit to output a plurality of different color patches on a recording medium, wherein each color patch is formed by the first color agent in a corresponding density and the second color agent in the fixed density each being applied uniformly in the patch;
   (b) a surrounding-area-data supplying portion that supplies surrounding area data to the image forming unit, wherein:
      the surrounding-area-data is formed from the second color agent in a fixed level of color density;
      the image forming unit forms a surrounding-area image with the fixed density of the second color agent on the recording medium in an area surrounding the plurality of color patches;
   (c) an input portion enabling a user to input his/her visual observation result of the plurality of color patches and the surrounding-area image on the recording medium; and
   (d) a calculating portion calculating output characteristics of the image forming unit for the first color agent based on the inputted observation result.

* * * * *